Oct. 23, 1934.  C. L. VAN INWAGEN, JR., ET AL  1,978,164
WIRE SPLICING MACHINE
Filed May 10, 1933  10 Sheets-Sheet 1

INVENTORS: O. A. MESCH
C. L. VAN INWAGEN, JR.
BY J. MacDonald
ATTORNEY

INVENTORS: O. A. MESCH
C. L. VAN INWAGEN, JR.
BY J. Mac Donald
ATTORNEY

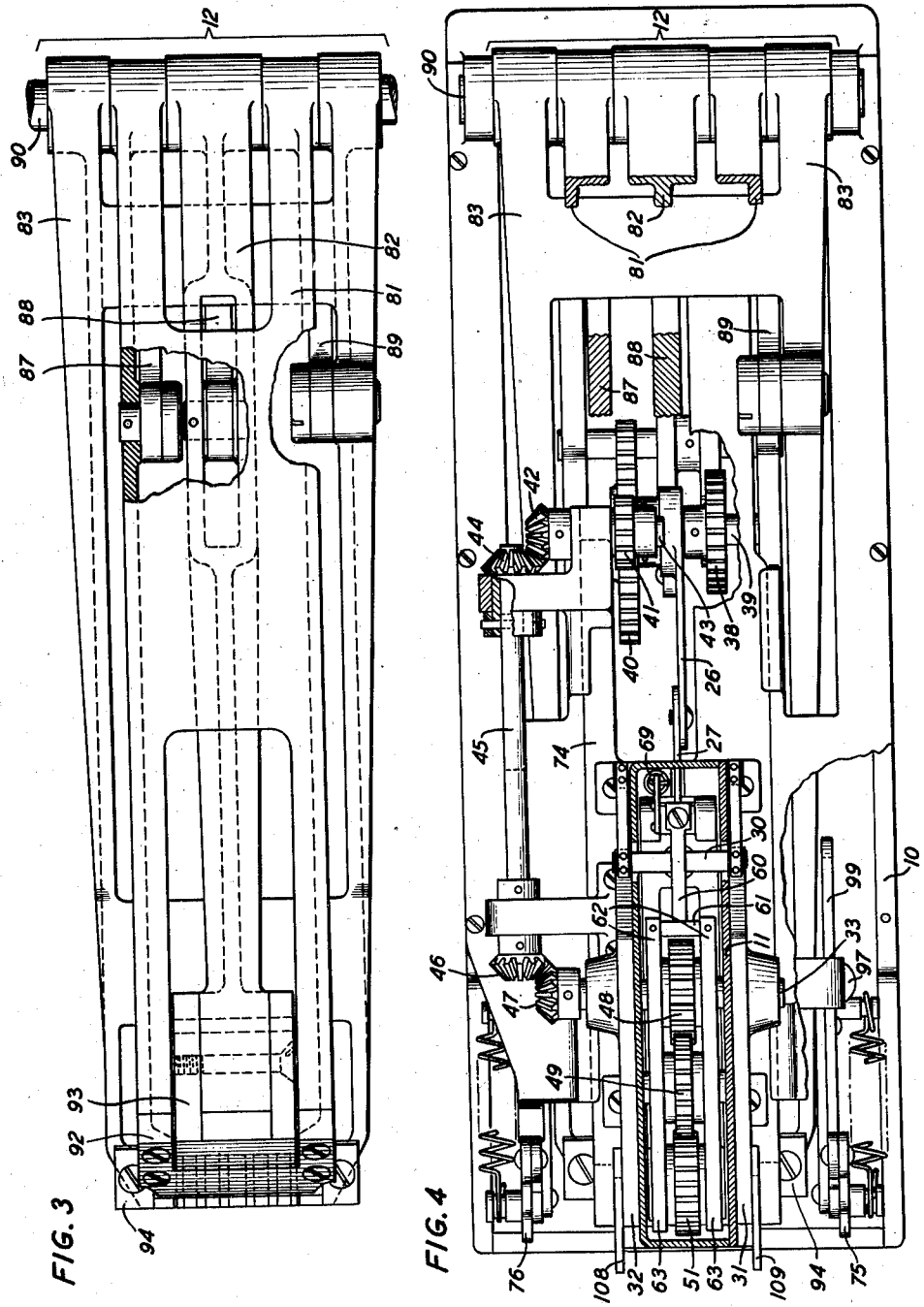

Oct. 23, 1934.  C. L. VAN INWAGEN, JR., ET AL  1,978,164
WIRE SPLICING MACHINE
Filed May 10, 1933  10 Sheets-Sheet 4

INVENTORS: O. A. MESCH
C. L. VAN INWAGEN, JR.
BY J. MacDonald
ATTORNEY

Oct. 23, 1934.　　C. L. VAN INWAGEN, JR., ET AL　　1,978,164
WIRE SPLICING MACHINE
Filed May 10, 1933　　10 Sheets-Sheet 5

INVENTORS: O.A. MESCH
C.L. VAN INWAGEN, JR.
BY J. Mac Donald
ATTORNEY

Oct. 23, 1934.   C. L. VAN INWAGEN, JR., ET AL   1,978,164
WIRE SPLICING MACHINE
Filed May 10, 1933    10 Sheets-Sheet 6
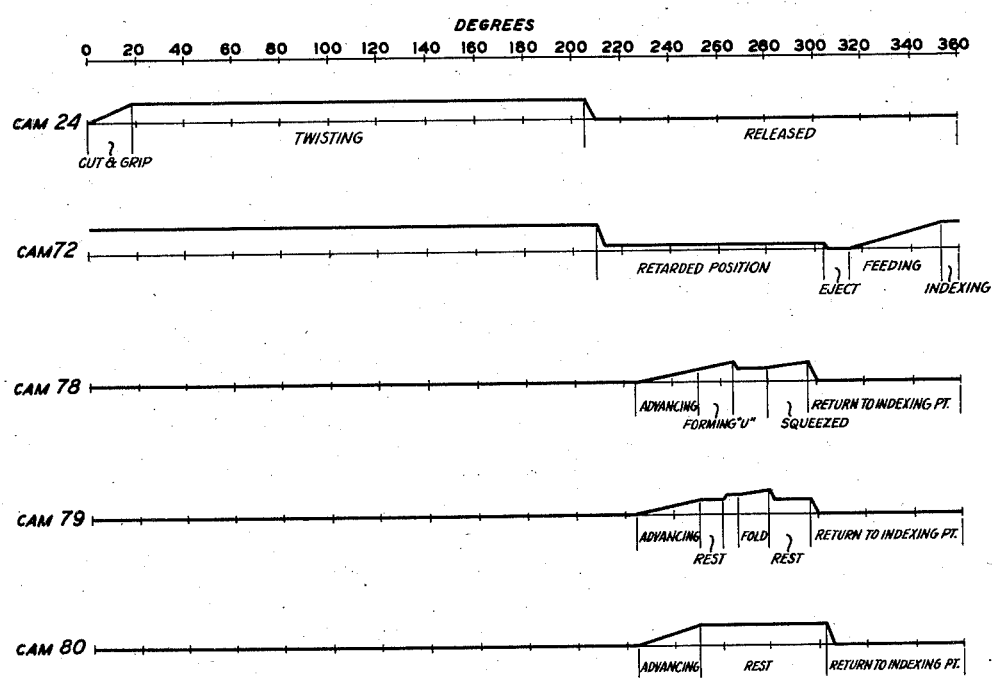
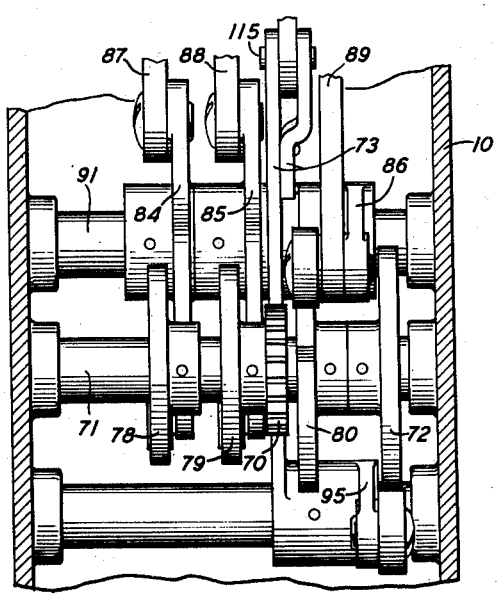
INVENTORS: O. A. MESCH
C. L. VAN INWAGEN, JR.
BY
ATTORNEY

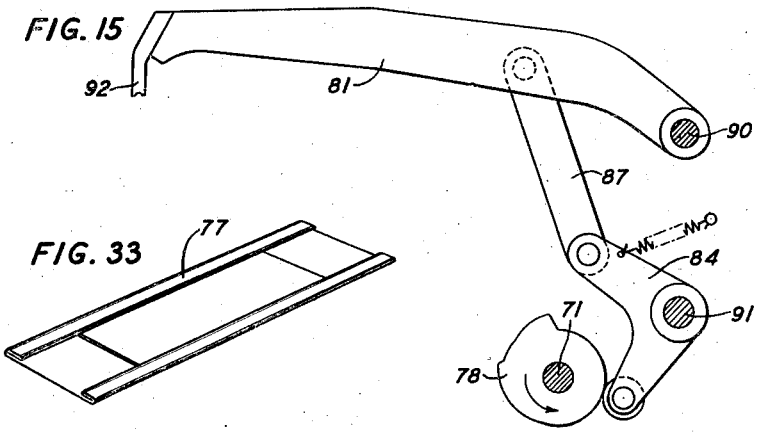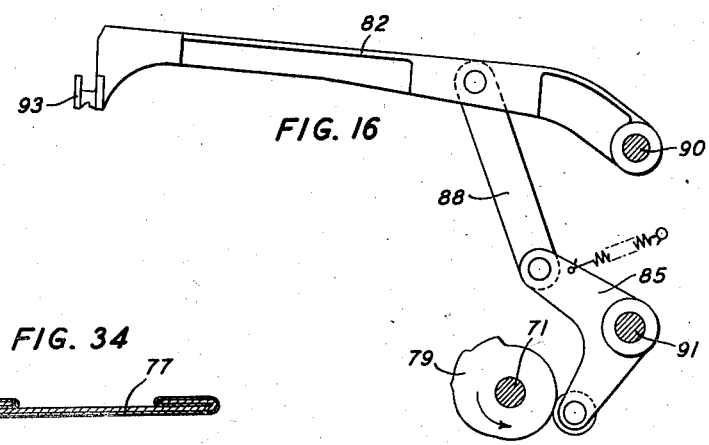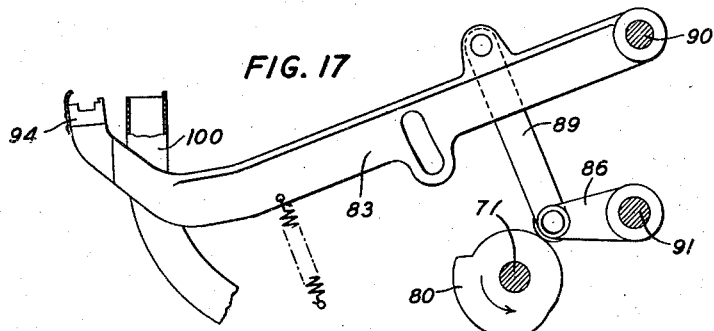

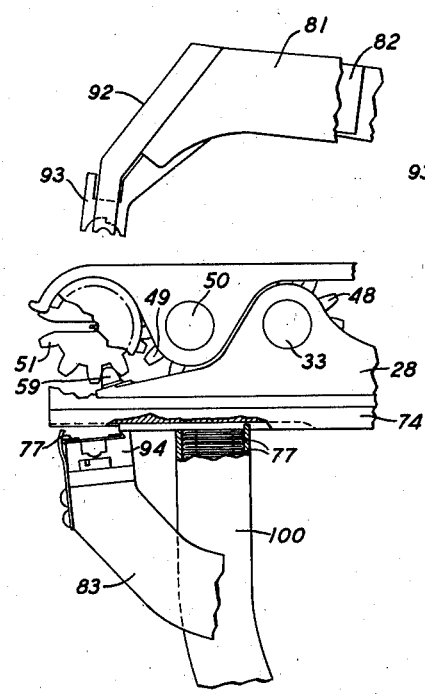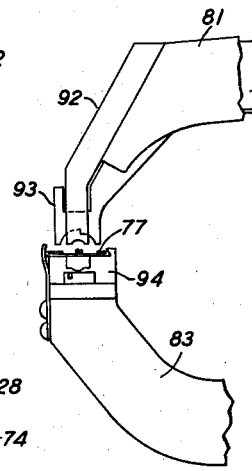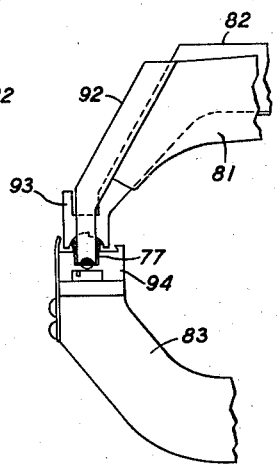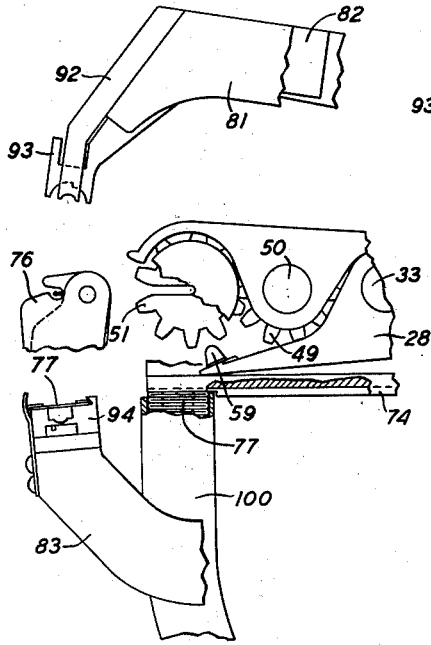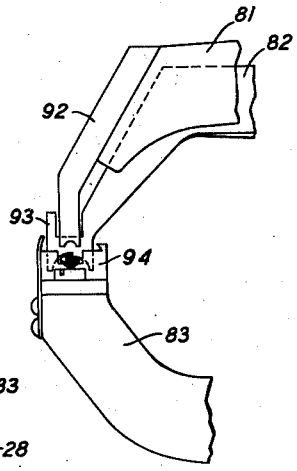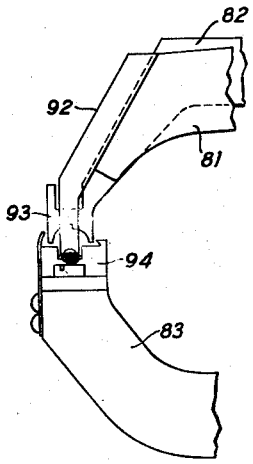

INVENTORS: O. A. MESCH
C. L. VAN INWAGEN, JR.
BY J. MacDonald
ATTORNEY

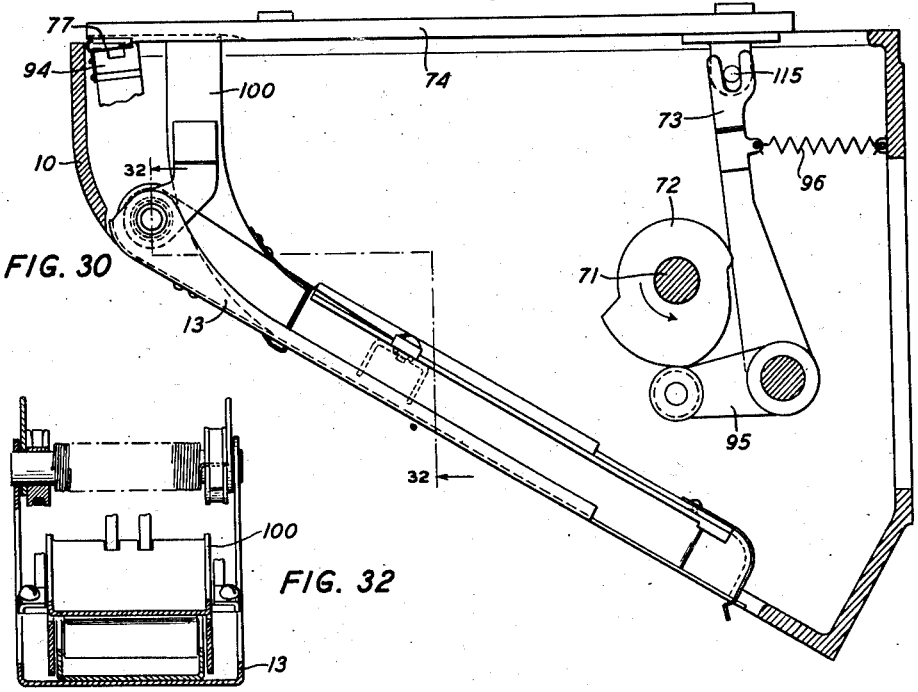
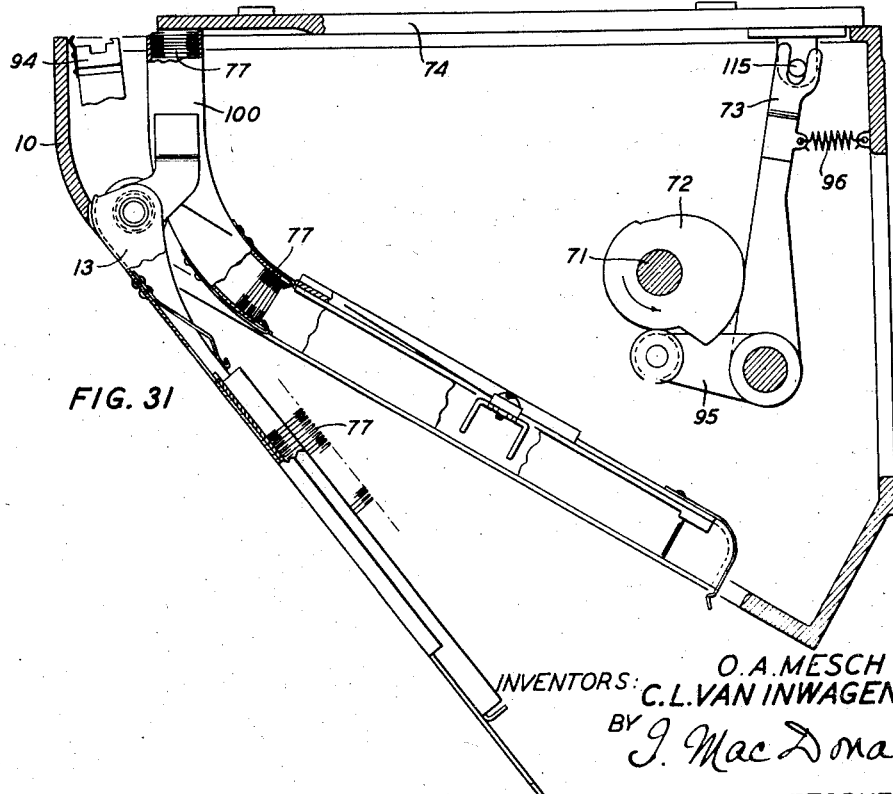

Patented Oct. 23, 1934

1,978,164

UNITED STATES PATENT OFFICE 1,978,164

WIRE SPLICING MACHINE

Charles L. Van Inwagen, Jr., Rutherford, N. J., and Orwar A. Mesch, Brooklyn, N. Y., assignors to Bell Telephone Laboratories, Incorporated, New York, N. Y., a corporation of New York Application May 10, 1933, Serial No. 670,266

14 Claims. (Cl. 140—113)

This invention relates to wire splicing machines for use in joining wires in multi-conductor cables and the like and more particularly to a machine which not only joins the wires together, but also insulates the joint as well.

An object of the present invention is to provide a machine which will join the wires and insulate the wires so joined in a workmanlike manner.

Another object of the invention is the provision of a machine which by a single operation joins the wires together and places an insulating clip therearound.

A further object of the invention is the provision of a machine which is not cumbersome and may be readily transported.

A still further object of the invention is the provision of a machine which is simple in operation and does not require a person skilled in the art to operate it.

A still further object of the invention is the provision of a machine which joins the wires in such a manner that the space required for a completed splice in a multi-conductor cable, is materially reduced in size.

A still further object of the invention is the provision of a machine which will materially reduce the time required to join the wires and insulate the joint in a multi-conductor cable.

In the present invention, the ends of the wires to be joined, normally extend in opposite directions. These wires are brought into contact with a pair of stripping pins located on each side of the twisting mechanism of the machine. The purpose of these stripping pins is to break the insulation on the wire, at a predetermined point, and to also serve as guides for introducing the wire into the twisting mechanism.

The stripping pins also guide the free ends of the wires into a mechanism which cuts off the surplus wire and securely grips the wires to be joined during the twisting operation. After the surplus portion of the wire has been cut off and the wires are located in their respective positions in the twisting mechanisms the wires are twisted into intimate contact with each other by means of a gear having a wire gripping mechanism integral therewith. After the wires have been twisted together by means of the rotation of said gear and the associated mechanism, the twisting unit is withdrawn leaving the joint exposed and held in place by means of a pair of levers which support the joint during the application of the insulating clip.

The wires joined are now exposed and are ready for the application of the insulating clip. These clips are stored in a magazine and fed to the clip-applying mechanism as required. After the twisting mechanism has been withdrawn the insulating clip, referred to above, is positioned directly under the twisted joint, and is located in position on a die block which is part of the mechanism which applies the clip to the wire joint.

The mechanism for applying the clip to the twisted joint comprises the die block referred to above together with a set of forming tools, said forming tools comprising a folding head and a punch head, both the die block and said forming tools being carried by a set of levers and adapted to fold the insulating clip over the wire. The completely insulated joint is then ejected from the machine by the same pair of levers which supported the wire during the application of the insulating clip.

Applicant's wire joining and insulating machine may be supported in any suitable manner which will bring it into close proximity with the cable to be spliced and applicants have shown in their drawings one suitable means of such support.

In the drawings:

Fig. 3 is a top plan view, partly in section, of the clip-applying mechanism;

Fig. 4 is a top plan view, partly in section, taken on line 4—4 of Fig. 2;

Fig. 13 is a schematic drawing illustrating the timing of the operations which takes place during one complete operating cycle of the machine;

Fig. 14 is a fragmentary top plan view, partly in section, illustrating the relative positions of the cams shown in Fig. 2;

Fig. 15 illustrates the punch supporting lever of the clip-applying mechanism and its associated cams;

Fig. 16 illustrates the folding head supporting lever of the clip-applying mechanism and its associated cams;

Fig. 17 illustrates the die supporting lever of the clip-applying mechanism, a portion of the clip feed magazine, and a cam for operating said die supporting lever;

Fig. 18 is a fragmentary view, partly in section, illustrating the relative position of the clip-applying mechanism, the clip feeding mechanism and a portion of the twisting unit;

Fig. 19 is a view similar to Fig. 18 after the wire has been twisted and the wires withdrawn prior to the application of the insulating clip;

Figs. 20, 21, 22 and 23 illustrate the various operations performed by the clip-applying unit during the application of the insulating clip to the joint;

Fig. 30 is a fragmentary view, in section, of the machine, illustrating the clip-feeding mechanism and its associated magazine in normal position with an insulating clip in position in the die portion as shown in Fig. 18;

Fig. 31 is a view similar to Fig. 30, with the clip magazine opened to receive a supply of clips and the clip-positioning mechanism ready to place a clip in the die block;

Fig. 32 is a sectional view taken along line 32—32 of Fig. 30;

Fig. 33 is a perspective view of the insulating clip;

Fig. 34 is a cross-sectional view of the insulating clip shown in Fig. 33; and

Figure 1:
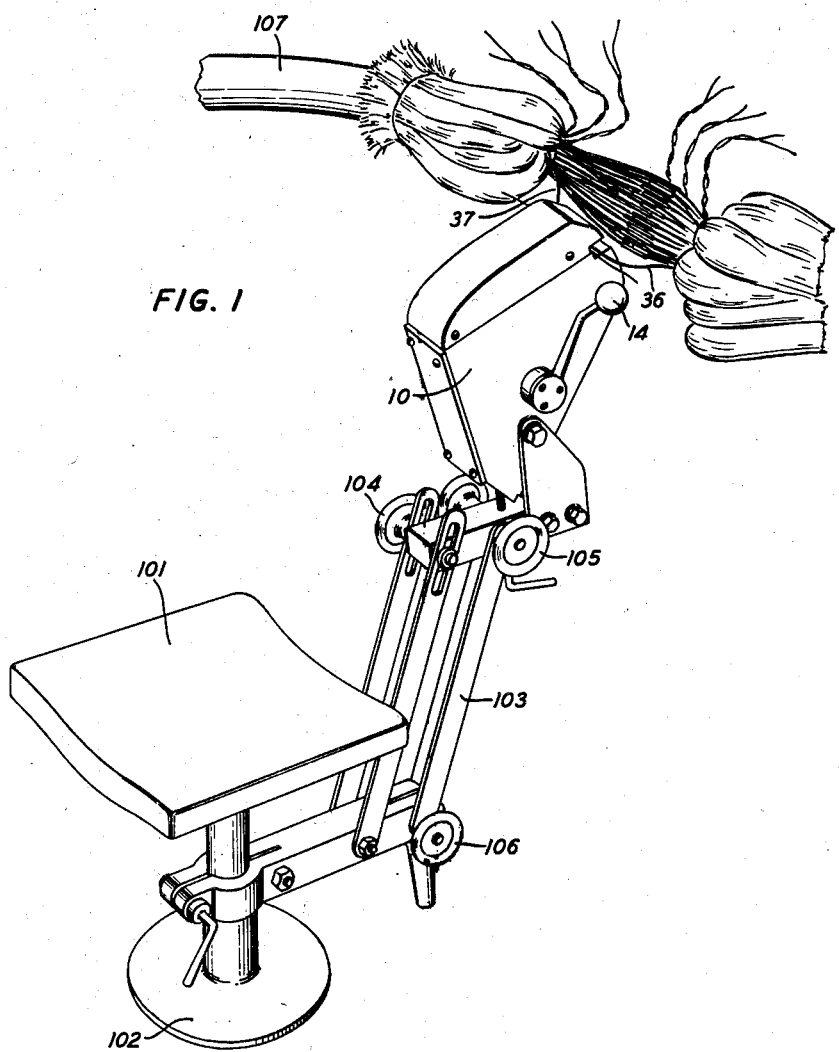
Fig. 1 is a perspective view of the machine associated with the cable to be spliced.
Figure 2:
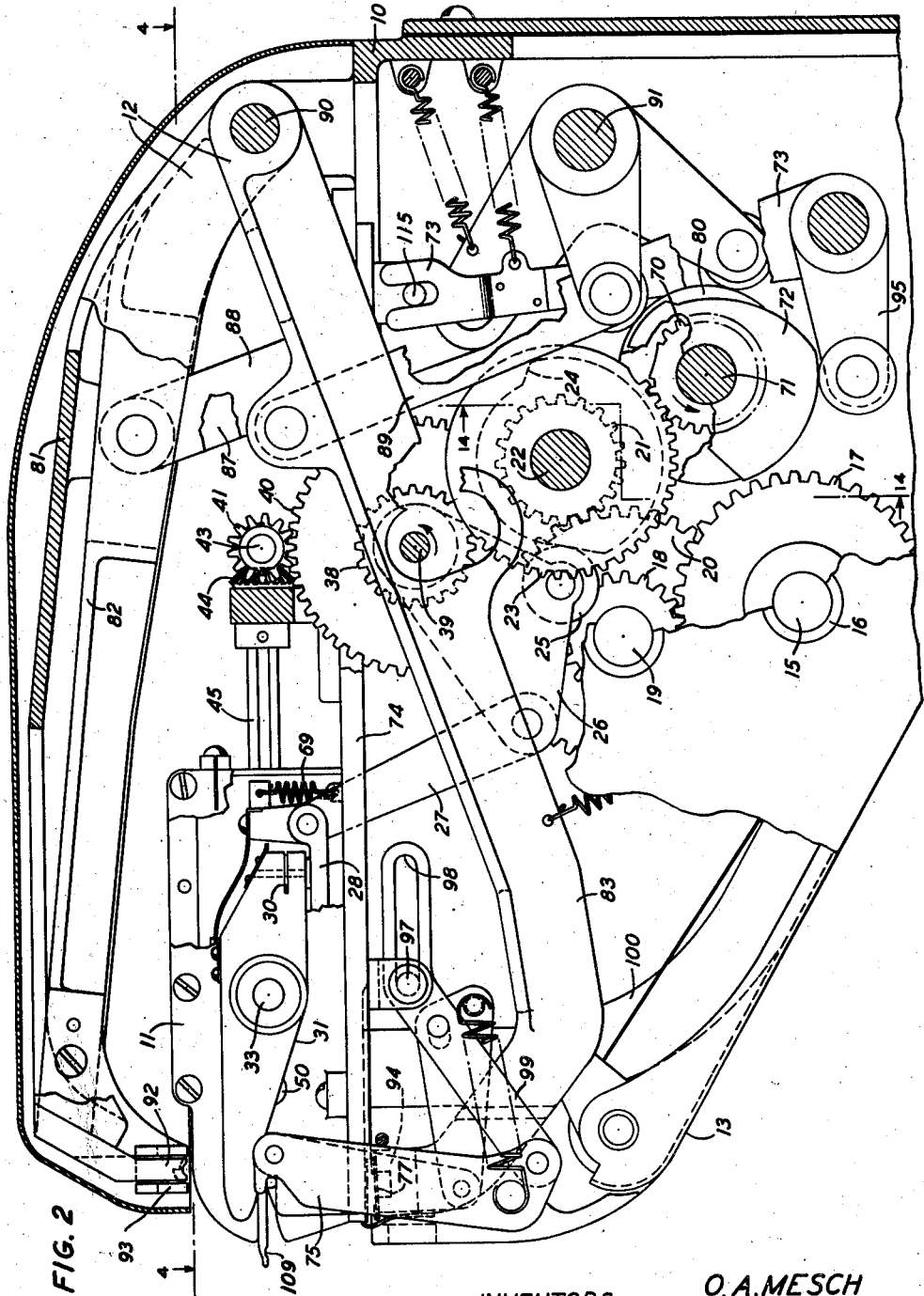
Fig. 2 is a side elevation, partly in section, illustrating the working elements of the machine.
Figure 5:
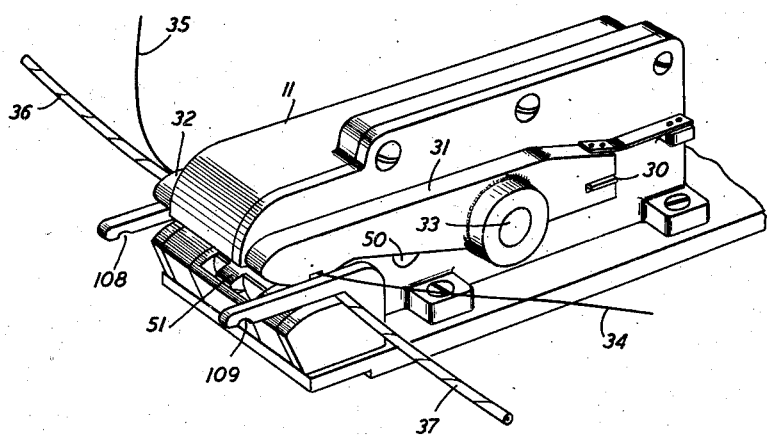
Fig. 5 is a perspective view of the twisting unit.

Referring now to Figs. 1 to 4, 30 and 31 of the drawings, 10 is a casing which encloses and supports the composite part of the machine, which comprises a twisting unit 11, as shown in Fig. 5, a clip-applying mechanism 12, as shown in Figs. 2 and 3, and a clip-feeding mechanism 13, as shown in Figs. 2, 30 and 31.

As shown in Fig. 1, a handle 14 is provided for the operation of the machine. This handle 14 is secured to the main driving shaft 15 in any suitable manner. The main driving shaft (shown in Fig. 2) is journalled in bearings 16 which in turn are mounted in the casing 10. Mounted on the shaft 15 is the main driving gear 17 which meshes with gear 18 on shaft 19. On shaft 19 adjacent gear 18, is a gear 20 which is adapted to mesh with a gear 21 mounted on the shaft 22. Secured on the shaft 22 adjacent the gear 21 is a cam 24, this cam operating through the roller 25 on the bell crank 26 through the link 27 and the lever 28, which is part of the twisting unit 11. The actuation of the lever 28, through the stud 29 and equalizing bar 30 (Fig. 6) causes the cutting and gripping levers 31 and 32 to rotate about the shaft 33 to cut off the surplus ends 34 and 35 of the wires 36 and 37 and to securely hold the wires 36 and 37 while they are being twisted together. (See Figs. 5, 7 and 8.)

On the shaft 22 is mounted an intermittent gear 23 which is arranged to cooperate with intermittent pinion 38, which is mounted on shaft 39 and dwells thereon during the period when the cutting and gripping levers 31 and 32 operate as described heretofore. When the teeth of the intermittent gear 23 mesh with the teeth of the intermittent pinion 38 the shaft 39 is caused to rotate one complete revolution. Carried on the shaft 39 adjacent the pinion 38 is a gear 40 which drives a pinion 41 which in turn drives the bevelled gear 42 mounted on shaft 43. This bevelled gear 42 drives the bevelled gear 44 which is slidably attached to the slotted shaft 45. Bevel gear 46 attached to the shaft 45 drives bevelled gear 47 attached to shaft 33 of the twisting unit 11, (Fig. 4).

The rotation of the train of gears just described causes the shaft 33 to rotate several complete revolutions upon the actuation of the operating handle 14.

Figure 6:
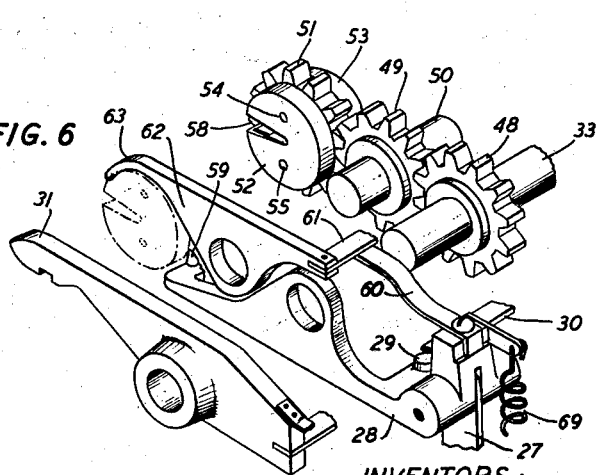
Fig. 6 is an exploded view, in perspective, illustrating the essential elements of the twisting mechanism.
Figure 9:
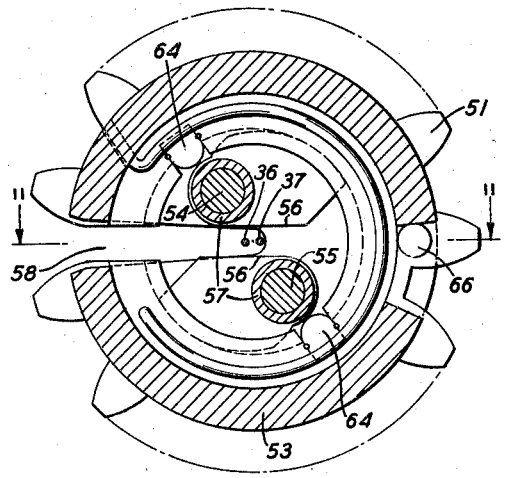
Fig. 9 is a view in section of the twisting gear in its normal position taken on line 9—9 of Fig. 11.
Figure 10:
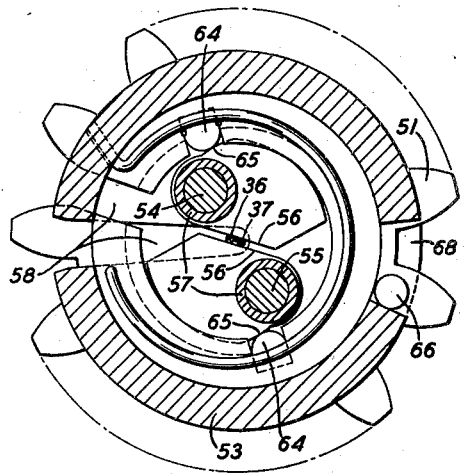
Fig. 10 is a sectional view of the twisting gear shown in Fig. 9 illustrating the relative position of the gripping members of the twisting gear during the twisting operation.
Figure 11:
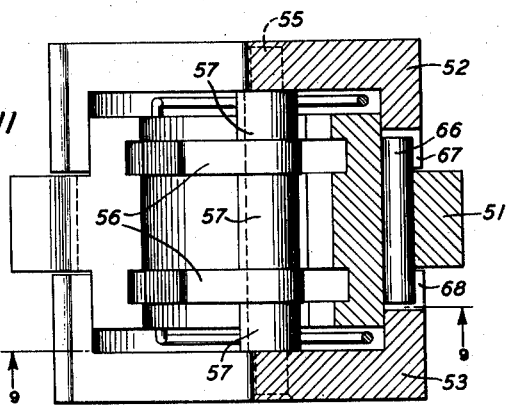
Fig. 11 is a sectional view taken on line 11—11 of Fig. 9.

Journalled in the side walls of the twisting unit 11 are shafts 33 and 50. Keyed to the shaft 33 is the gear 48 which meshes with an idler gear 49, mounted on shaft 50, said gear 49 meshing in turn with twisting gear 51, as shown in Figs. 4 and 6. As shown in Figs. 9, 10 and 11 the gear 51 is assembled between a pair of drums 52 and 53 and is arranged to rotate on its hubs a limited amount with respect to the drums 52 and 53 which form the bearings for the hubs of the gear, said drums 52 and 53 being journalled in the side walls of the twisting unit 11. The gear 51 with its associated drums 52 and 53 form a unitary structure by means of the shoulder pins 54 and 55 which pass through an aperture in the gear 51 and are secured to the drums 52 and 53 at each end.

With further reference to Figs. 9, 10 and 11 which illustrate in detail the wire twisting gear 51, shown in Figs. 5 and 6, this gear is provided with a means on its interior for securely gripping the wires during the twisting operation. This gripping means on the interior of the gear 51 comprises a plurality of fingers 56, which are pivotally mounted on the pins 54 and 55 and held in spaced relation by means of the tubular spacers 57. The fingers 56 are free to open to receive the wires when the gear 51 is in its normal position, the wires being guided in between the fingers 56 by means of the slot 58 which extends through the gear 51 and the drums 52 and 53. The operation of the twisting gear 51 (shown in Figs. 6, 9, 10 and 11) and its associated parts which make up the twisting unit 11 (shown in Fig. 5) may be briefly described as follows: The lever 28 which has heretofore been described in connection with the operation of the cutting and twisting mechanism is pivoted on shaft 33. This lever 28 carries on its free end a tooth-shaped stud 59 which is arranged to engage with the teeth of the gear 51 for the purpose of locating the slot 58 in the proper position to receive the wires to be twisted.

Mounted adjacent the link 27 on the lever 28 is a spring 60, the free end of which engages with the equalizing bar 61, which in turn is connected to the ends of the levers 62, said levers being pivoted on the shaft 50 on each side of the idler gear 49.

When the lever 28 is actuated, in addition to operating the cutting and gripping mechanism which functions at the end of the joint as heretofore described, the tooth-shaped stud 59 is disengaged from the teeth of the twisting gear 51 thereby permitting the gear freedom of rotation. Simultaneously, through the medium of spring 60, and equalizing bar 61, the levers 62 are caused to rotate on the shaft 50 a sufficient amount to cause the ends 63 of the levers 62 to frictionally engage with the drums 52 and 53 of the twisting gear assembly as shown in Fig. 6. The amount of pressure exerted on the drums 52 and 53 by the ends 63 of the levers 62 is controlled by means of the spring 60.

The operation just described takes place during the period in which the intermittent pinion dwells on intermittent gear 23. When the teeth 23 engage the teeth of pinion 38, as shown in Fig. 2, through the trains of gears 38, 40, 41, 42, 44, 46 and 47, the gears 48, 49, 50 and 51 in twisting unit 11 are rotated a predetermined number of revolutions. During the period that these gears are rotating, levers 62 frictionally engage the drums 52 and 53 causing the drums to lag behind the motion of the gear 51, as illustrated in Fig. 10. The relative motion between the gear 51 and the drums 52 and 53 causes keys 64 which are mounted diametrically opposite each other on the interior of the gear 51 (see Figs. 9 and 10), to engage the cam-shaped surface 65 of the fingers 56 which are pivotally secured to the drums 52 and 53 as previously described. This action causes the fingers 56 to securely grip the wires 36 and 37 which have been introduced therebetween as shown in Fig. 10.

The wires now being gripped by the fingers 56 on the interior of the gear 51, the friction exerted by the levers 62 on the drums 52 and 53 is overcome by the force transmitted by the gearing (as heretofore described) and the drums 52 and 53 are now caused to rotate with the gear 51 by means of the pin 66 which extends through the gear 51 into the slots 67 and 68 of the drums 52 and 53.

Figure 12:
Fig. 12 illustrates the type of joint twisted by the mechanism shown in Fig. 5, and is an enlarged view thereof.

The continued rotation of the gear 51 and associated drums 52 and 53 a predetermined number of times by means of the train of gears 38, 40, 41, 42, 44, 46 and 47, which are operated by the intermittent gear 23, cause the wires 36 and 37 to be twisted together to form a joint as shown in Fig. 12.

After the wires have been twisted as shown in Fig. 12, the train of gears, referred to above, come to rest by virtue of the dwell on the intermittent gear 23 thereby locating the twisting gear 51 and its slot 58 in normal position. Further motion of the shaft 22, upon which the intermittent gear 23 is mounted, causes the cam 24, also mounted on said shaft, to release through bell crank 26 and link 27, the lever 28 of the twisting unit 11. Due to the tension of spring 69 the lever 28 is actuated in the opposite direction thereby causing the stud 59 to engage the teeth of the twisting gear 51 and to simultaneously release the pressure of levers 62 on the drums 52 and 53 thereby permitting the drums 52 and 53 to assume their normal positions with respect to the gear 51; that is, with the slots in the drums in alignment with the slot in the gear 51.

Upon further rotation of the intermittent gear 23 the teeth of this gear engage with the teeth of the intermittent pinion 70 which up to this point has been inactive due to the dwell on these respective gears. The pinion 70 is keyed to the cam shaft 71 which carries the cam 72. Bell crank 73 is associated with cam 72 and connected to the sliding member 74, at the point 115. Mounted on the forward end of the sliding member 74 is the twisting unit 11 which has heretofore been described in detail. Due to the continuous motion of shaft 71 the cam 72 permits the bell crank lever 73 which is connected with the sliding member 74, to draw said sliding member and the twisting mechanism 11 toward the rear of the machine as shown in Fig. 31.

The wires 36 and 37 have now been twisted together and are supported in an exposed position by means of the lever arms 75 and 76 which are shown in Figs. 2, 4 and 19. The joint thus formed is ready for the application of the insulating clip 77 which is shown in Figs. 33 and 34.

The cam shaft 71 is driven by the intermittent gear 23 through intermittent pinion 70 and has a series of cams 78, 79 and 80 mounted thereon as shown in Fig. 14 and shown in detail in Figs. 15, 16 and 17. The continued rotation of cam shaft 71 and its associated cams causes the levers 81, 82 and 83 of the clip-applying mechanism 12 to operate in the following sequence which will be described in detail.

The levers 81, 82 and 83 which form the mechanism for applying the insulating clip to the wire joint are all pivotally mounted on the frame casting 10 by means of a common shaft 90.

Mounted on the free end of lever arm 81 is a punch head 92 which is caused to move in a downward direction; that is, towards the wire joint, by means of cam 78, bell crank lever 84, and the link 87. Simultaneously lever arm 82, with its folding head 93 mounted thereon at its free end, is caused to move in a downward direction with the lever 81 by means of cam 79, bell crank 85, and the link 88. At the same time as the lever arms 81 and 82 are moving downwardly the lever arm 83 with the die block 94, having the insulating clip 77 therein, is moved upward into contact with the wire joint by means of the cam 80, bell crank 86, and link 89.

As shown in Fig. 20 the punch 92, the folding head 93 and the die block 94 are all brought into juxtaposition with respect to the wire joint at the same time. At this point the folding head 93 stops while the punch 92 and the die block 94 continue their movement to form the insulating clip into a substantially U-shaped member with the twisted wire joint nested therein as shown in Fig. 21. The punch head 92 is now withdrawn and simultaneously the folding head 93 resumes its downward motion, the concave surfaces of the folding head causing the sides of the clips to be folded one over the other as shown in Fig. 22. Following this operation the punch head now moves downward and forces the folded over edges of the clip into intimate contact with each other and with the wire joints as shown in Fig. 23.

Continued motion of the cam shaft 71 allows the lever arms 81, 82 and 83 to assume their normal positions, leaving the insulated wire joint supported by the lever arms 75 and 76. Further motion of the cam shaft 71 causes the lower part of the cam 72 to engage with the short crank 95 which is part of bell crank 73. This permits the sliding member 74 to travel rearwardly due to the tension of spring 96, causing the stud 97 mounted on the sliding member 74 to engage with the end of the slot 98 of the link 99 which is connected to the lever arms 75 and 76 which are supporting the insulated wire joint. The further movement to the rear of the sliding member 75 causes the levers 75 and 76 to swing forward and simultaneously releases the wires which have just been joined together and insulated. Upon further movement of the cam shaft 71, the cam 72 is caused to rotate and thereby operate bell crank 73 which in turn causes sliding member 74 to travel to the front portion of the machine as shown in Figs. 2 and 30.

Located on the underside of the front end of the sliding mechanism 74 is a recess which is in line with the top opening of the clip magazine 100 when the sliding member 74 is in its rearmost position. At this point, due to the spring pressure on the stored clips in the magazine 100, these clips are forced upwardly thereby causing the top clip of the pile to enter into the recessed portion of the sliding member 74. As the sliding member 74 travels forward it removes the top clip from the pile and carries it forward and places it in the die 94. This completes the cycle of operation and the machine is now ready to twist and insulate another joint.

In order that applicants' machine may be adapted to splice various sizes of cable in various positions and locations there has been provided a suitable mounting structure as shown in Fig. 1. This mounting structure comprises a seat 101. Associated therewith is a base or supporting member 102. Adjustable brackets 103 are adjustably secured to the support for the seat 101 and carry the cable splicing machine. The position of the splicing machine may be varied by means of the handwheels 104, 105 and 106. This adjusting bracket allows the cable splicing machine to be placed in close proximity to the cable 107.

In making joints in accordance with applicants' improved cable splicing machine, the folowing steps are taken.

The wires 36 and 37 which are to be joined are selected from the cable 107, one from the right and the other from the left. The right-hand wire 36 is introduced into the notch on the underside of the stripping pin 108 and wire 37 from the left is introduced into the notch on the underside of stripping pin 109. The wires are then bent at a slight angle at this point of contact with the pins. Further tension on the ends of the wire causes the insulation to break so that it may be removed from this point outwardly.

Figure 7:
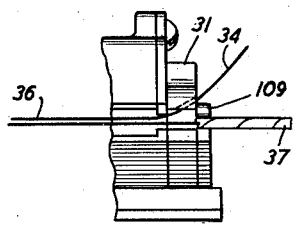
Fig. 7 is a fragmentary view of Fig. 5 illustrating the mechanism which severs and grips the wires.
Figure 8:
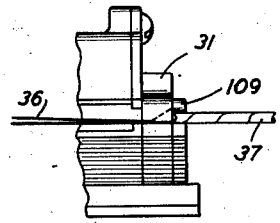
Fig. 8 is a view similar to Fig. 7, except that the surplus wire has been severed and the wires gripped for twisting.

The wires 34 and 35 as shown in Fig. 5, thus bared, are now placed on top of the opposite stripping pins 108 and 109 and serve to guide the wires into the cutting and gripping mechanism as shown in Figs. 7 and 8.

When the wires have been drawn back into the slot in the twisting gear and into the notches in the cutting and gripping members 31 and 32, they are ready to be twisted and are ready for the operation which will not only twist the wires together but will also place an insulating clip therearound.

The handle 14 is now operated toward the operator. This causes the mechanism in the machine, which has heretofore been described in detail to operate, thus causing first, the cutting off of the surplus wire ends 34 and 35. The free ends of the wires 36 and 37 are now gripped by means of the members 31 and 32, and the twisting gear 51 is now caused to rotate and grip the wires at a point equi-distant between the aforementioned gripping means, the further rotation of the gear 51 causing the wire to be twisted together in a tight joint as shown in Fig. 12.

After the twisting of the wire has been completed and the wire is being held in place by means of the arms 75 and 76, the twisting mechanism slides out of position toward the rear of the machine, thereby leaving the twisted wire joint exposed and supported by the levers 75 and 76. The twisted joint is now ready to receive the insulating clip 77 which is located below the wire joint in the die block 94, this clip having been placed in the die block by the forward motion of the sliding member 74 on the completion of the previous cycle.

Figure 35:
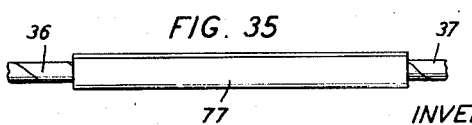
Fig. 35 illustrates the completely insulated joint as it appears after it is ejected from the machine.
Figure 24:
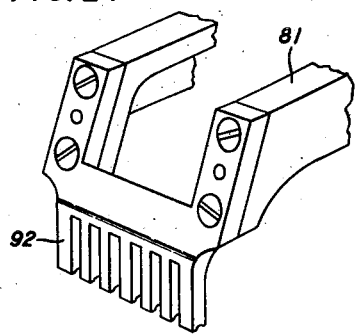
Fig. 24 is a fragmentary view, in perspective, illustrating in detail the front portion of the lever shown in Fig. 15.
Figure 25:
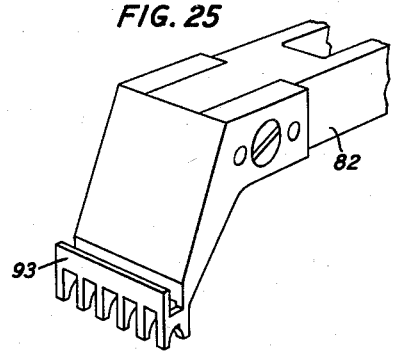
Fig. 25 is a fragmentary view, in perspective, illustrating in detail the folding head part of the lever shown in Fig. 16.
Figure 26:
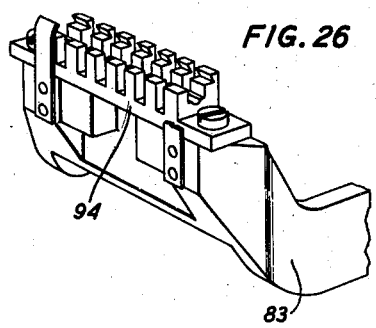
Fig. 26 is a fragmentary view, in perspective, illustrating in detail the die portion of the lever shown in Fig. 17.
Figure 27:
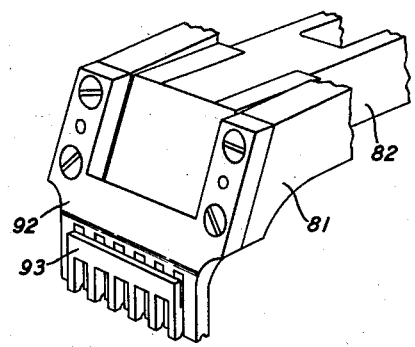
Fig. 27 is a fragmentary view, in perspective, illustrating the relative position of the punch shown in Fig. 24 and the folding head in Fig. 25 when the two levers shown in Figs. 15 and 16 are assembled in the machine.
Figure 28:
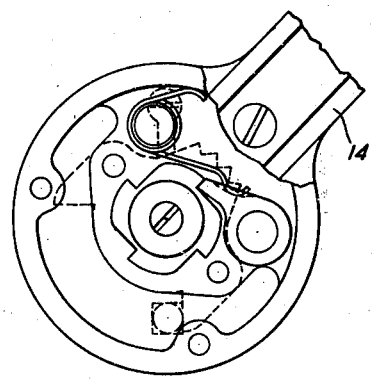
Fig. 28 is a fragmentary view, partly broken away, illustrating the ratchet portion of the operating lever.
Figure 29:
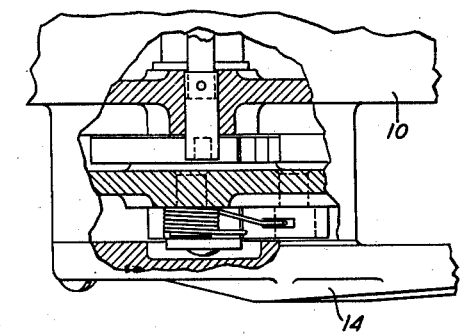
Fig. 29 is a fragmentary view, partly in section, of the mechanism shown in Fig. 28 taken on line 29—29.

The clip applying mechanism 12 which comprises a series of levers 81, 82 and 83 which in turn are operated by a series of cams 78, 79 and 80 cause the insulating clip 77 in the die block 94 to be folded tightly around the wire joint as shown in Fig. 35.

The operation of the machine is completed by the clip-applying mechanism returning to normal, the clip and its wire joint being ejected from the machine and the twisting unit restored to its normal position in the forward part of the machine and carrying with it the insulating clip and depositing it in the die block.

It is apparent from the foregoing description that various modifications and changes may be made in the invention without departing from the spirit of applicants' invention.

What is claimed is:

1. In a machine for splicing wires, in combination, means for joining the wires together, means for operating the same, and means for folding an insulating clip over said joint.

2. In a machine for splicing wires, in combination, means for joining the wires together, means for operating the same, and means for folding a clip of composite material over said joint.

3. In a machine for splicing wires, in combination, means for joining the wires together, means for operating the same, means for applying an insulating clip over said joint, said clip being composed of metal on one side and insulation on the other.

4. In a machine for splicing wires, in combination, means for twisting the wires together, means for operating the same, means for applying an insulating clip over said twisted portion of the wire, said clip being composed of metal on one side and insulation on the other.

5. In a machine for splicing wires, in combination, means for twisting the wires together, means for operating the same, and means for molding an insulating clip over the twisted portion of said wires.

6. In a machine for splicing wires, in combination, means for twisting the wires together, means for operating the same, and means for folding an insulating clip of composite material over the twisted portion of said wire.

7. In a machine for splicing wires, in combination, means for twisting the wires together, means for operating the same, means for applying an insulating clip over said twisted portion, said insulating clip being composed of metal on one side and insulating material on the other.

8. In a machine for splicing wires, in combination, means for joining the wires together and means for operating the same, means for applying an insulating member over the joined portions of the wire, and a means for feeding said insulating member to said applying means.

9. In a machine for splicing wires, in combination, means for twisting the wires together, means for operating the same, means for applying an insulating member over the joined portions of the wire, and means for feeding said insulating member to said applying means.

10. In a machine for splicing wires, in combination, means for joining the wires together, means for operating the same, means for holding the wires during the operation of said joining means, and means for applying an insulating clip on the joined portions of the wire.

11. In a machine for splicing wires, in combination, means for twisting the wires together, means for operating the same, means for holding the wires during the operating of said twisting means, and means for applying an insulating clip over the joined portions of the wire.

12. In a machine for splicing wires, in combination, means for joining the wires together, means for operating the same, means for holding the wires and cutting off the surplus, said means holding said wires during the operation of said joining means, and means for applying an insulating clip over the joined portions of the wire.

13. In a machine for splicing wires, in combination, means for twisting the wires together, means for operating the same, means for holding the wires during the operation of said twisting means, and means for ejecting the finished joint from said holding means upon the completion of the holding operation.

14. In a machine for splicing wires, in combination, means for joining the wires together, means for operating the same, means for holding the wires during the operation of said joining means, and means for moving said twisting means away from the twisted portion of the wire upon the completion of the twisting operation.

CHARLES L. VAN INWAGEN, Jr.
ORWAR A. MESCH.